US006898834B1

(12) United States Patent
Warren

(10) Patent No.: US 6,898,834 B1
(45) Date of Patent: May 31, 2005

(54) BARREL STAVE RECLAIM

(75) Inventor: Peter Warren, Willunga (AU)

(73) Assignee: Westbridge Pty Ltd, Leeming (AU)

( * ) Notice: Subject to any disclaimer, the term of this patent is extended or adjusted under 35 U.S.C. 154(b) by 118 days.

(21) Appl. No.: 10/378,290

(22) Filed: Mar. 3, 2003

(51) Int. Cl.⁷ .............................................. B23P 17/04
(52) U.S. Cl. ................. 29/403.1; 29/401.1; 29/402.11; 29/402.12; 29/402.14; 29/403.3; 29/412; 29/414; 29/417
(58) Field of Search .......................... 29/401.1, 402.09, 29/402.11, 402.12, 402.14, 402.19, 402.21, 29/403.1, 403.3, 412, 414, 415, 417; 217/72, 217/88, 90, 3 CB, 91

(56) References Cited

U.S. PATENT DOCUMENTS

| 3,259,055 A | * | 7/1966 | Labs .......................... 99/277.1 |
| 3,710,836 A | * | 1/1973 | Busch .......................... 147/28 |
| 3,842,723 A | * | 10/1974 | Boucher ..................... 99/277.1 |
| 4,813,565 A | * | 3/1989 | Croser .......................... 217/88 |
| 5,054,381 A | * | 10/1991 | DePeaux et al. ............ 99/277.1 |
| 5,102,675 A | * | 4/1992 | Howell et al. ............... 426/422 |
| 5,174,461 A | * | 12/1992 | Sullivan ........................ 217/88 |
| 5,343,911 A | * | 9/1994 | Humphrey ................ 144/134.1 |
| 5,481,960 A | * | 1/1996 | Sullivan ..................... 99/277.1 |
| 5,630,265 A | * | 5/1997 | Stone ....................... 29/402.06 |
| 5,647,268 A | * | 7/1997 | Sullivan ..................... 99/277.1 |
| 6,378,419 B1 | * | 4/2002 | Ecklein ...................... 99/277.1 |
| 2003/0157216 A1 | * | 8/2003 | Plumb ........................... 426/11 |
| 2004/0129680 A1 | * | 7/2004 | Andries ........................ 217/72 |

FOREIGN PATENT DOCUMENTS

| CA | 2275836 | * | 12/2000 | ............ B27M 1/08 |
| GB | 2208668 A | * | 4/1989 | ........... E04H 17/14 |

* cited by examiner

Primary Examiner—Essama Omgba
(74) Attorney, Agent, or Firm—Cook, Alex, McFarron, Manzo, Cummings & Mehler, Ltd.

(57) ABSTRACT

A method of reclaiming non-wine affected oak wood from a stave removed from a wine barrel or cask. The wine affected wood is removed as by sawing, the remaining non-wine affected wood is sawn into battens, dressed, straightened and toasted. The reclaimed oak battens can then be immersed in wine.

10 Claims, 4 Drawing Sheets

SECTION 'A-A'

BARREL STAVE RECLAIM

This invention relates to the reclaiming or reuse of the staves of wine barrels.

In the production of many wines it is necessary for the wine to be contained or in contact with oak wood during either the fermentation or maturation or storage of the wine. However the surface of the wood in contact with the wine becomes impregnated with the wine and thus compounds within the oak wood for the flavouring or conditioning of the wine are unavailable.

Thus it is desirable for the barrels to be reconditioned to remove the surface layer of the staves of the barrel to expose clean wood so that the stave and barrel can be reused. Either the barrel is dismantled for cleaning by shaving of the staves or the interior of the barrel is shaved either manually or by machine. However the staves of the barrel can only be shaved a limited number of times at which time the thickness of the staves is not sufficient for the strength of the barrel. Thus bending of a stave and leakage from the barrel can occur. When in use on the barrel only one surface of the stave is available to be contacted by the wine and thus the oak stave is not efficiently used.

It is apparent the supply of good quality oak can diminish due to the expansion world wide of the wine industry demanding a greater supply of good quality oak. Thus it is desirable for there to be a greater utilisation of the oak wood currently available in barrels currently in use or discarded after the use by date determined by age or number of shavings.

Thus it is an object of the invention to utilise the available oak to a greater extent.

It is a further object of the invention to treat and condition staves removed from a barrel so that the effective life or number of uses of the wood in the stave can be extended whereby virtually all of the wood in the stave can be effectively used.

A further object of the invention is to provide for the insertion of a plurality of treated and conditioned staves to be placed in the wine at a desired stage of its production.

Thus there is provided according to the invention a process of conditioning staves removed from a barrel, including machining and toasting (heating) the staves and providing means whereby the staves can be submerged in the wine.

Preferably the staves are split or cut into thinner battens to increase the available surface area available to the wine.

Preferably a plurality of the conditioned staves or battens are assembled in a rack prior to being inserted into a vat or other storage container of wine.

Preferably the rack is circular whereby the staves are assembled in virtual non-contact with adjacent staves.

Preferably each alternate stave is of different width.

Briefly the process for creating the staves for reuse will be described.

A barrel is dismantled and the staves removed, the concave surface of the staves previously forming the interior of the stave being severely impregnated with wine and having coating of crystals produced by the wine stored in the barrel. The curved staves which are usually 30 nm thick are then passed through a narrow band saw and cut into 3 thinner battens each of about 10 mm thick.

The thin batten containing the inner surface of the barrel may be chipped and/or shredded and spread over the vineyard, these chips being of great value to the soil and the vines growing thereon.

The two remaining thin battens thus free from any contamination from the previous use as a stave of a barrel are then passed through a thicknesser or buzzer to dress the surface of the thin battens to produce a smooth surface on the thin battens. It is believed this dressing by a thicknesser, planer or buzzer using very sharp cutters in effect opens or by removal of the surface exposes the open pores of the wood. This produces a very smooth surface on the wood. The finished battens are in the order of 7.5 mm thick.

The battens are then passed over a far infra-red pre-heater as described in our earlier patent application AU87300/01. However in the present process the batten is passed over the pre-heater with the concave surface facing the heater and weights are positioned on the battens. While passing over the pre-heater the weights cause the thin batten to be substantially straightened.

The batten is then passed over the heater for the heating or what is called toasting and during this toasting process the batten is straightened and returns to its original straight condition prior to be being heated and bent into its curved shape to form the barrel.

The batten is toasted on one side and also toasted on the other side. Reference can be made to our above noted patent application AU87300/01 describing the theory behind the heating and toasting of oak wood.

It is noted if the batten is toasted having a surface condition created by a band saw, the toasting will cause burning and smoking from the small minute jagged edges and surface created by the band saw.

In order to more fully describe the invention reference is now made to the accompanying drawings in which.

Figure 1:
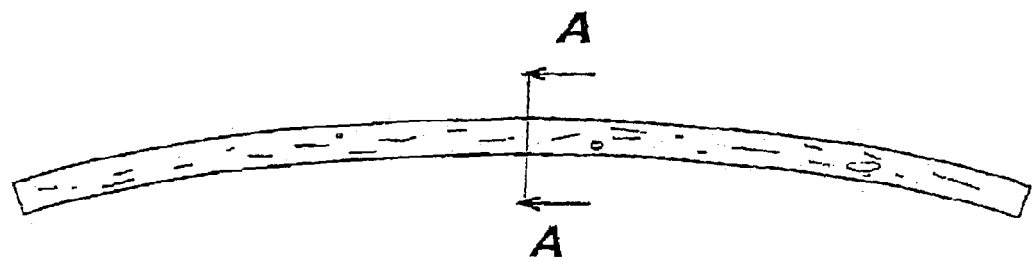
FIG. 1 is a view of a curved stave removed from a barrel.
Figure 2:
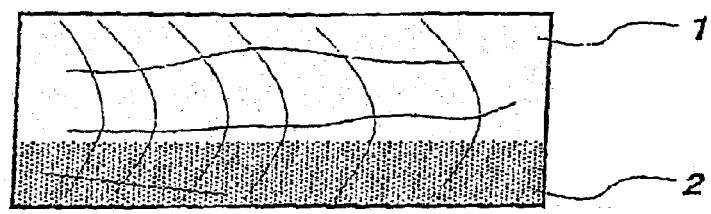
FIG. 2 is a cross section of the stave of FIG. 1 showing the contaminated portion of the stave.
Figure 3:
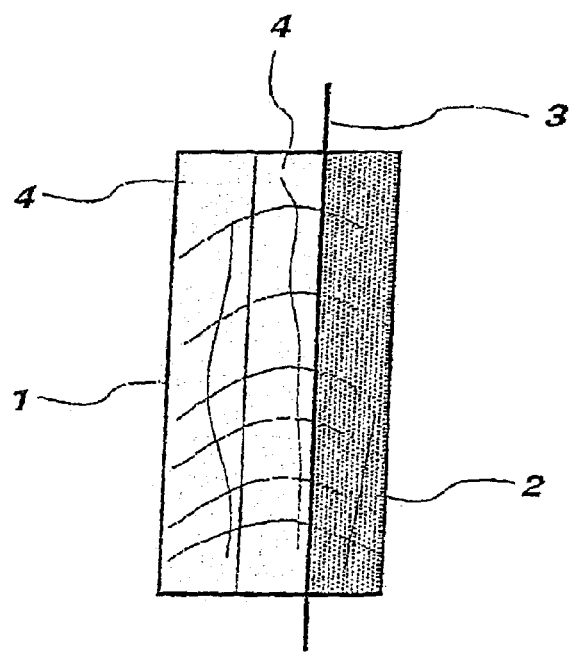
FIG. 3 is a view of the stave being cut into three battens.
Figure 4:
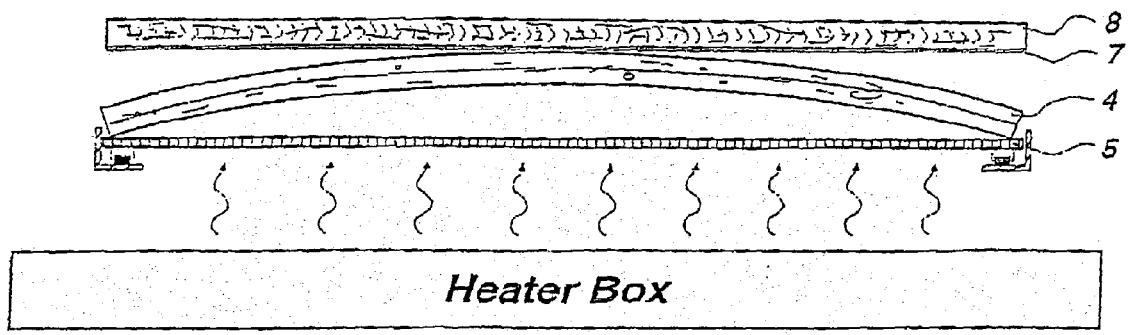
FIG. 4 is a view of battens being preheated in two layers.

Referring now to FIGS. 1 to 3, a barrel is dismantled and the curved staves 1 (only one of which is shown) have a severely impregnated portion with wine and crystals often to a depth of about one third of the thickness of the stave. This impregnated portion 2 is removed by passing the curved stave through a saw such as a band saw 3 to remove the impregnated portion 2. The remainder of the stave is then sawn into two battens 4. A typical barrel requires 30 staves to assemble the barrel, and thus by this invention 60 battens are obtained. If the staves are obtained from a barrique 225 liter oak cask, the most common size used, the 60 battens produced will provide approximately an additional 8 sq. meters of oak surface to be used in the wine industry. Previously virtually none of this oak was reused, often the casks being cut into two to make containers for the growing of plants.

The battens 4 are then passed over a planer or thicknesser to remove the rough surface produced by the saw blade and to provide a smooth surface.

To partially straighten the battens 4 are positioned on a conveyor 5 over a heater box 6. Preferably the battens are positioned in two layers, the bottom layer preheating the top layer. A stainless steel sheet 7 is positioned on top of the top layer and a weight 8 is placed on top of the stainless steel sheet. Preferably the weight is such that it extends across the width of the conveyer, so that as the battens straighten, the downward force is applied over the increasing length of the battens. It has been found an evenly distributed load of 30 Kg per square meter is a suitable load. If a lesser weight is applied the battens may be heated to a too high temperature during the straightening procedure. For the second group of battens the top battens would be positioned as the bottom layer.

The next stage of the process finally straightens and toasts the battens. Two layers of battens are placed on a conveyor, a stainless steel sheet is positioned over the layers of battens and a weight is placed on the stainless steel sheet. Again this weight is evenly distributed across the whole area of the layer of battens. In both instances it has been found that a weight of about 30 kg per square meter is satisfactory, it being realised that a weight greater or lesser may be satisfactory.

Figure 9:
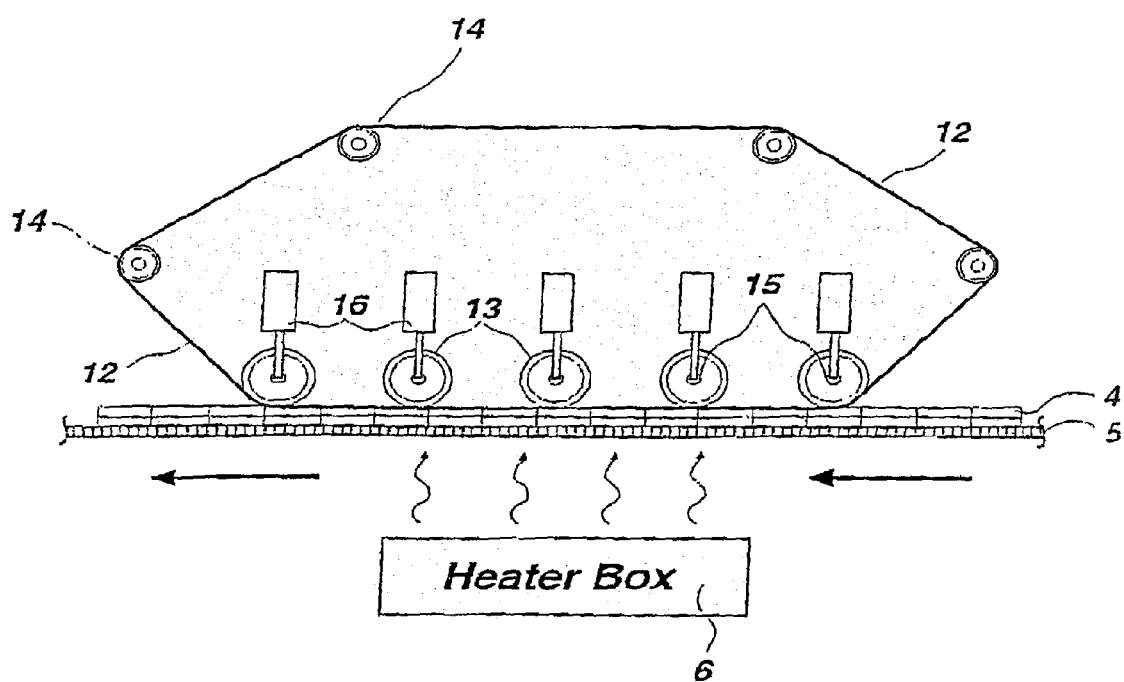
FIG. 9 shows an alternate form of loading the battens.

Instead of placing an evenly distributed weight on the battens, the conveyor may pass the battens under a movable belt of the like loaded to provide a downward force on the upper surface of the battens. Thus as shown in FIG. 9 the downward force can be applied by a belt 12 passing around adjustably loaded rollers 13 and return rollers 14. Preferably the belt is a stainless steel belt to reflect any heat and retain any moisture released by the heating. The rollers 13 and mounted on axles 15 and either adjustable springs or hydraulic cylinders 16 are provided at each end of the axles to load the rollers downwardly. Each of the hydraulic cylinders are connected to an adjustable pressure valve, whereby one single adjustment of the valve will adjust each cylinder to equally load each roller.

Figure 5:
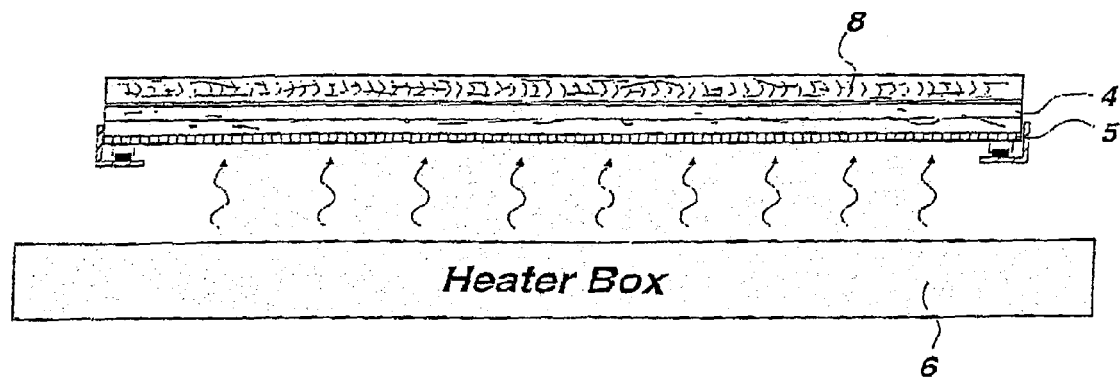
FIGS. 5 and 6 are side and end views of the heater toasting and finally straightening the battens.
Figure 6:
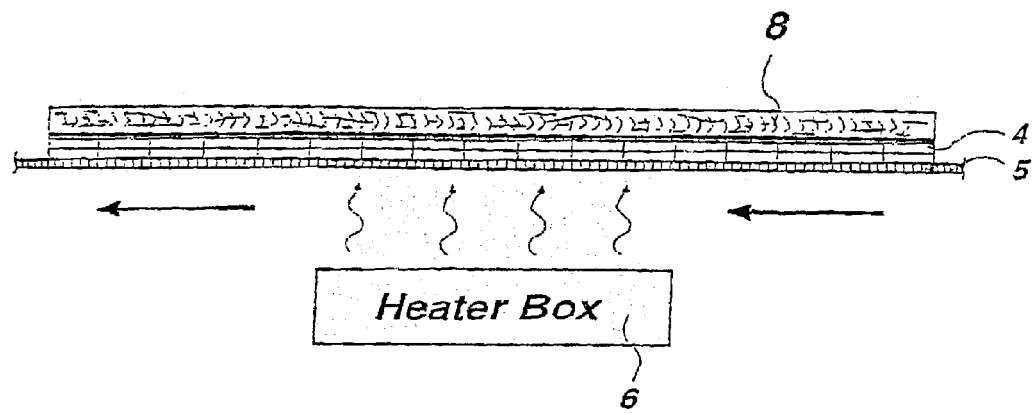

As shown in FIGS. 5 and 6 the two layers of battens are passed over the heater box containing the far-infra red heaters. The top layer of battens is preheated during the toasting of the bottom layer. All of the battens are toasted on both sides. When the bottom layer is toasted, the top layer is placed on the conveyor to be toasted and a further layer of battens placed on top to be preheated.

The provision of the stainless steel sheet retains the moisture in the battens. This permits the chemical reaction to take place at a lower temperature in the presence of moisture. The presence of moisture enables the complex change of wood compounds to develop other compounds such as Cis-Oak Lactones and Vanillins. These compounds produce the pleasant aroma characteristics of "coconut" and "vanilla".

The heating and toasting of the battens is as described in our above mentioned patent application.

Figure 7:
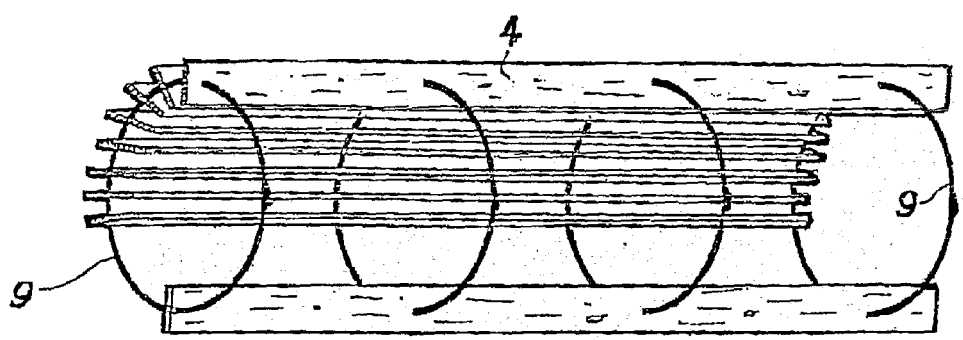
FIG. 7 shows the battens assembled on a ring.
Figure 8:
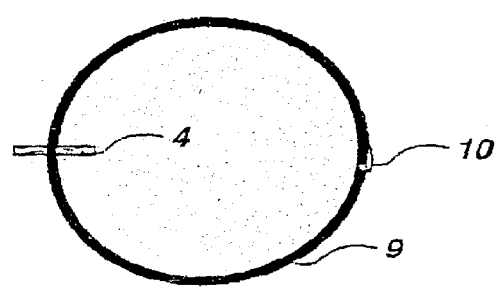
FIG. 8 shows details of the ring and clip closing the ring.

The battens 4 are drilled with a hole spaced from each end and two further holes spaced along the battens and as shown in FIG. 7 are threaded on to stainless steel rings 9. Each ring has a stainless steel clip 10 to permit the ring to be opened and the battens threaded thereon. When the battens are no longer suitable for use, the battens can be removed and replaced with further reclaimed oak battens. Preferably each alternate batten is of a different width to its neighbours this assisting in ensuring there is nil or minimum contact between adjacent battens. It is preferred the rings have a diameter such that the outside diameter of the assembled rack of battens is approximately 300 mm. This diameter is such that the rack of battens can be placed through an access opening in a vat or other wine holding or fermentation tank. A typical ring is shown in FIG. 8.

Thus the assembled battens or rack of battens is cylindrical in form and can be lifted and handled by a single person by grasping the rings. A typical rack of battens containing 60 battens will have a surface area of approximately 8 square meters, thus providing a large surface area of oak to be in contact with the wine.

The rack of battens can then be placed in a fermentation tank or other tank or the like through the access opening on top of the tank. On insertion the rack of battens will float but until reaching the same specific gravity as the wine will then settle to the bottom of the tank. When the tank is emptied it is a simple matter of retrieving the rack through the lower opening. When immersed in the wine both sides of the batten are subject to the wine and when retrieved after use there is virtually no portion of the stave which has not been subject to the wine, i.e. there is virtually no unused wood in any of the staves. After retrieval the rack of staves are washed and removed from the stainless steel rings. These staves are then chipped or shredded and spread on the vineyard.

The use of the rack of battens in a vat or the like in this manner obviates the need for a person to enter the vat or tank for cleaning purposes.

The rack of staves can be used in any process in the production of wine from fermentation stage and when the wine is removed from the fermentation vessel and is transferred to other storage vessels and barrels or to a vat as described in patent U.S. Pat. No. 617,673, this vat being commonly termed a "stakvat". A rack of staves can be inserted through the side door of a "stakvat".

Hence it will be seen that oak in used barrels which are usually discarded can be fully utilised, thus producing a great saving to wineries. The reclaimed oak can be used by itself or with a mixture of new oak, and thus the rack of battens can be either all reclaimed oak, all new oak, or a mixture of the two.

In the above example the stave is divided into a number of battens prior to straightening, the invention also can include the straightening of the stave prior to being divided into the number of battens. By dividing the stave into the battens each batten is easier to straighten than straightening the stave prior to being divided. However the invention also includes the straightening of the stave prior to being divided.

The above example described the production of two battens free from wine affected oak from a stave, the invention also contemplates the production of only one batten or more than two battens depending on the thickness of the stave and the degree of wine affected oak on the stave. Also the battens need not be straightened, but can be toasted on one or both sides by suitable mechanism providing relative movement between the heater and the surface of the batten.

With the present invention the amount of oak required for flavouring can be easily increased or decreased as required by the wine maker. Also by the present invention it is not so necessary for persons to enter a tank for cleaning purposes or for placement or retrieval of spent oak and also the initial welding of brackets to the inside of tanks to accommodate oak.

Hence it can be seen by the present invention there is a great saving in oak wood to the wineries. The wood in barrels which are usually discarded can be reclaimed for use, thus saving the purchase of new oak for flavouring purposes.

Although one form of the invention has been described in some detail it is to be realised that there may be various ways of reclaiming the oak from the staves of barrels. For example the staves may be straightened by the application of heat for a long period of time together with larger forces prior to the conditioning of the stave for flavouring purposes.

In an alternate form of the invention the staves may be cut or sawn length wise to produce rectangular rod like strips having four sides available to the wine.

Thus the invention can include variations and modifications falling within the spirit and scope of the invention.

What is claimed is:

1. A method of reclaiming unused oak from staves of a decommissioned wine barrel or cask including the steps of obtaining staves having wine affected oak from a dismantled wine barrel or cask, passing the staves through a band saw to remove the wine affected oak and provide at least one batten of non-wine affected oak from each stave, each batten having a concave surface, placing the battens concave surface down on a conveyor, positioning a sheet having a heat reflective surface on the upper surface of the battens, positioning a weight on the heat reflective sheet, causing relative movement between a heat source positioned beneath the conveyor and the conveyor whereby the battens are straightened by the application of heat and pressure applied by the weight on the heat reflective sheet, and toasting the battens for further use in conditioning wine.

2. A method as defined in claim 1 including the additional step of dressing sawn surfaces of the battens to provide smooth surfaces thereon prior to toasting.

3. A method as defined in claim 2 including the additional step of assembling the toasted battens on at least a pair of rings to form a cylindrical rack of battens whereby the rack of battens can be inserted through an opening into a vat or tank of wine.

4. A method as defined in claim 1 wherein the heating step includes the step of placing the battens in two layers on the conveyor, placing the heat reflective sheet and weight on top of the second layer.

5. A method of reclaiming unused oak from staves of a decommissioned wine barrel or cask including the steps of obtaining staves having wine affected oak from a dismantled wine barrel or cask, passing the staves through a band saw to remove the wine affected oak and provide at least one batten of non-wine affected oak from each stave, each batten having a concave surface and a convex side, heating the concave surface of the battens while applying pressure to the convex side to straighten the battens, positioning the straightened battens on a conveyor, positioning a heat reflective sheet on the battens, passing the straightened battens over a heat source to toast the side of the battens facing the heat source, repositioning the battens to toast the opposite side of the battens, and removing the battens from the conveyor.

6. A method as defined in claim 5 including the additional step of dressing sawn surfaces of the battens to provide smooth surfaces thereon prior to toasting.

7. A method as defined in claim 6 including the additional step of assembling the toasted battens on at least a pair of rings to form a cylindrical rack of battens whereby the rack of battens can be inserted through an opening into a vat or tank of wine.

8. A method as defined in claim 5 including positioning a weight on the heat reflective sheet to apply the pressure on the battens.

9. A method as defined in claim 8 wherein the heating step includes the step of placing the battens in two layers on the conveyor, placing the heat reflective sheet and weight on top of the second layer.

10. A method of reclaiming unused oak from staves of a decommissioned wine barrel or cask including the steps of obtaining staves having wine affected oak from a dismantled wine barrel or cask, removing the wine affected oak and dividing the staves to provide at least one batten of non-wine affected oak from each stave, each batten having a concave surface and a convex side, heating the concave surfaces of the battens while applying pressure to the convex side of each batten to straighten the battens, followed by placing the battens on a conveyor, causing relative movement between the conveyor and a heater positioned beneath the conveyor to toast the surface of the battens facing the heater and repositioning the battens to toast the opposite surfaces of the battens.

* * * * *